(12) United States Patent
Knaup

(10) Patent No.: US 9,260,155 B2
(45) Date of Patent: Feb. 16, 2016

(54) BICYCLE SHIFT LEVER

(71) Applicant: Sue Knaup, Prescott, AZ (US)

(72) Inventor: Sue Knaup, Prescott, AZ (US)

( * ) Notice: Subject to any disclaimer, the term of this patent is extended or adjusted under 35 U.S.C. 154(b) by 0 days.

(21) Appl. No.: 14/474,113

(22) Filed: Aug. 30, 2014

(65) Prior Publication Data

US 2015/0059516 A1 Mar. 5, 2015

Related U.S. Application Data

(60) Provisional application No. 61/872,127, filed on Aug. 30, 2013.

(51) Int. Cl.
*F16C 1/10* (2006.01)
*B62K 23/06* (2006.01)
*B62M 25/04* (2006.01)

(52) U.S. Cl.
CPC ............... *B62K 23/06* (2013.01); *B62M 25/04* (2013.01)

(58) Field of Classification Search
CPC .............................. B62M 25/04; B62M 23/06
USPC ........... 74/488, 489, 502.2; 16/421, 422, 430; D8/399; 411/154, 156, 160, 543
See application file for complete search history.

(56) References Cited

U.S. PATENT DOCUMENTS

| | | | | |
|---|---|---|---|---|
| 4,840,081 A * | 6/1989 | Nagano | ........................ | 74/502.2 |
| 4,966,046 A * | 10/1990 | Tagawa | ........................ | 74/502.2 |
| 5,123,296 A * | 6/1992 | Chang | ........................ | 74/502.2 |
| 5,575,178 A * | 11/1996 | Wu | ........................ | 74/489 |
| 7,243,762 B2 * | 7/2007 | Tsai | ........................ | 188/24.22 |
| 2006/0053940 A1 * | 3/2006 | McLaughlin et al. | ....... | 74/502.2 |

* cited by examiner

*Primary Examiner* — Adam D Rogers
(74) *Attorney, Agent, or Firm* — Zeman-Mullen & Ford, LLP

(57) ABSTRACT

A bicycle shift lever having a lever member and a base member that can be combined with other commonly available parts to enable connection of the lever member and base member to the derailler on a bicycle so that it can enable a user of the bicycle to shift between gears.

6 Claims, 10 Drawing Sheets

BICYCLE SHIFT LEVER

CROSS-REFERENCE TO RELATED APPLICATIONS

This application claims priority to provisional patent application having Ser. No. 61/872,127, filed Aug. 30, 2013, which is herein incorporated by reference in its entirety.

FIELD OF INVENTION

The present invention generally relates to a simplified bike shift level that functions for new bicycles or to replace broken or non-functioning bicycle shift levers on existing or used bicycles so that the bicycles can be refurbished for future use. More particularly, the present invention relates to a simplified bike shift lever that comprises a unique lever member and a unique base member that can both be combined with four or more other common parts to connect the lever member and the base member to the derailleur on a bicycle with cables to create a bicycle shift lever secured to the handlebars of the bicycle thereby enabling a user of the bicycle to shift between gears.

BACKGROUND OF THE INVENTION

Disadvantaged people in both developing countries and developed countries have little or no access to affordable quality bicycles that can be used for transportation. In addition, the increased unavailability of basic bicycle parts further limits bicycle access to these disadvantaged populations in that the refurbishing of existing or used bicycles becomes impossible without replacement parts.

Accordingly, there is a need for basic bicycle parts that are simple and inexpensive to make and that may also be used with other common hardware components to achieve the same function as broken or nonrepairable existing bicycle parts. The present invention is just one such bicycle part.

DESCRIPTION OF EXEMPLARY EMBODIMENTS OF THE INVENTION

The bicycle shift lever of the present invention includes a unique lever member and a unique base member that can be coupled using other common hardware components such as a bolt and nut and even a common bottle cap such as the bottle caps that are used on bottles containing soda. Once coupled, the bicycle shift lever can be secured to the handlebars of a bicycle with a common hose clamp.

The lever member of the present invention can be cast using scrap aluminum and comprises a circular portion that extends into a bar member portion which functions as the lever for shifting gears. The circular portion includes a channel around its circumference for retaining a cable that runs to the derailleur. The base member may also be cast using scrap aluminum and comprises a bottom cylindrical portion which extends into a top side portion where the top side portion functions to assist in seating the circular portion of the lever member on top of the bottom cylindrical portion of the base member. The top side portion of the base member has two separate openings contained therein for inserting a cable therethrough that runs to the derailleur.

The bicycle shift lever of the present invention is connected to a new or used bicycle to create a functioning shift lever by seating the circular portion of the lever member on top of the bottom cylindrical portion of the base member such that it rests against the top side portion of the base member, inserting a cable through a first opening in the top side portion of the base member, running the cable around most of the circumference of the circular portion of the lever member and then out through the second opening in the top side portion of the base member, securing the lever member to the base member by positioning a washer such as a flattened bottle cap having a hole in its center on top of the circular portion of the lever member, inserting a bolt through the hole in the flattened bottle cap member and the center openings or holes contained within the circular portion of the lever member and the bottom cylindrical portion of the base member, securing the lever member to the base member by using a nut positioned adjacent the bottom of the bottom cylindrical portion of the base member to tighten the bolt, securing the resulting bicycle shift lever to the handlebar of the bicycle with a common hose clamp, and connecting the cable that runs through the bicycle shift lever to the derailleur of the bicycle.

Figure 1:
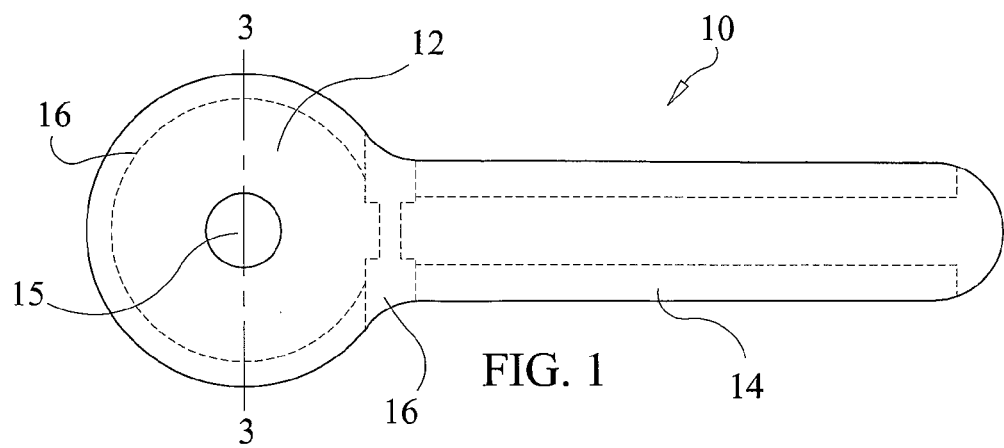
FIG. 1 is a top plan view of a lever member of a first exemplary embodiment of a bicycle shift lever of the present invention.
Figure 2:
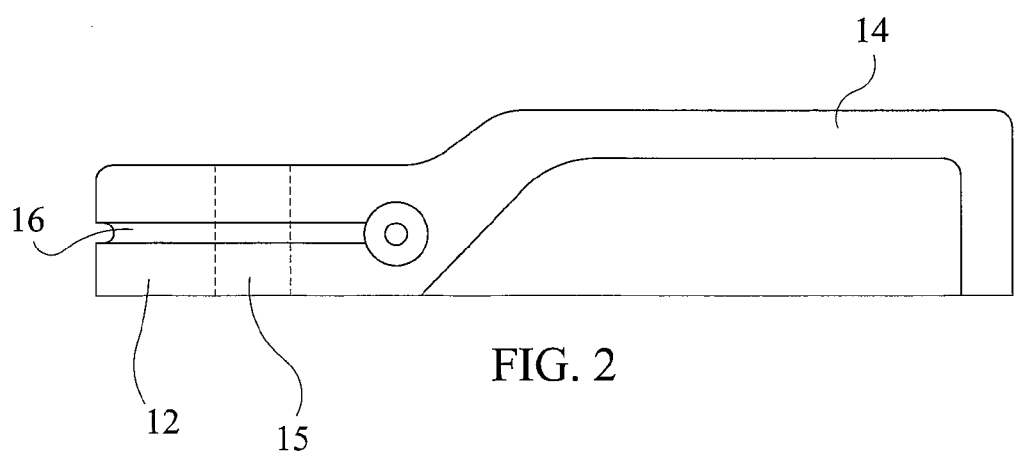
FIG. 2 is a side elevational view of the lever member of the exemplary embodiment of the bicycle shift lever shown in FIG. 1.
Figure 3:
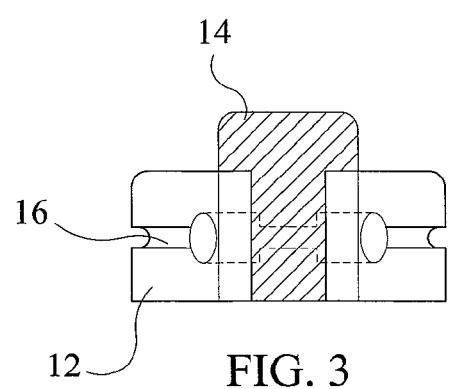
FIG. 3 is a cross-sectional view taken along line 3-3 of FIG. 1.

FIG. 1 shows a top plan view of a lever member 10 of a first exemplary embodiment of a bicycle shift lever of the present invention where the lever member 10 includes a circular portion 12 that extends into a bar member portion 14. Circular portion 12 of lever member 10 has a central opening 15 contained therethrough and a channel 16 positioned about its circumference where the channel 16 functions to retain a cable that is connected to a derailler on a bicycle. FIG. 2 is a side elevational view of the lever member 10 shown in FIG. 1 and FIG. 3 is a cross-sectional view of the lever member 10 taken along line 3-3 of FIG. 1.

Figure 4:
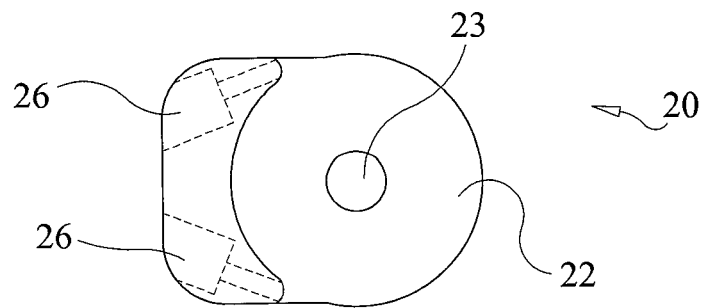
FIG. 4 is a top plan view of a base member of a first exemplary embodiment of a bicycle shift lever of the present invention.
Figure 5:
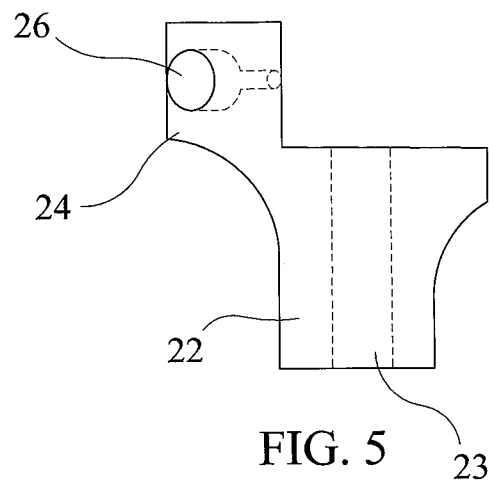
FIG. 5 is a side elevational view of the base member of the exemplary embodiment of the bicycle shift lever shown in FIG. 4.
Figure 6:
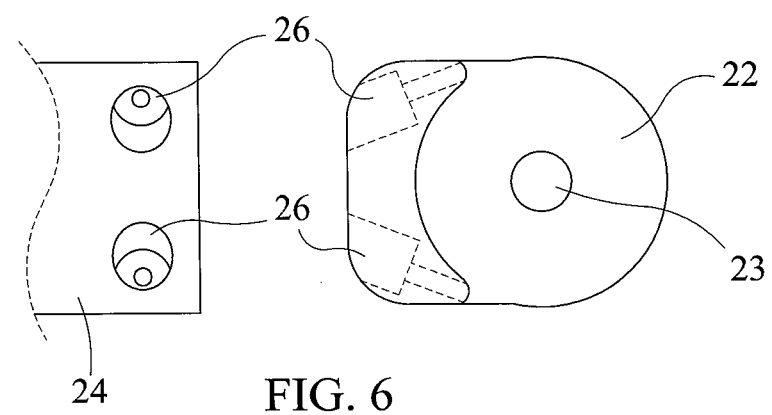
FIG. 6 is a cross-sectional view taken along line A-A of FIG. 4.

A base member 20 of a first exemplary embodiment of a bicycle shift lever of the present invention is shown in FIGS. 4-6. Base member 20 includes a bottom portion 22 having a central opening 23 contained therethrough and a top side portion 24, having two openings 26 contained therein, extending from the bottom portion 22. The same cable that is retained by channel 16 in circular portion 12 of lever member 10 is inserted through openings 26 and then connected to the derailler on a bicycle when the components of the bicycle shift lever of the present invention are coupled together.

Figure 7:
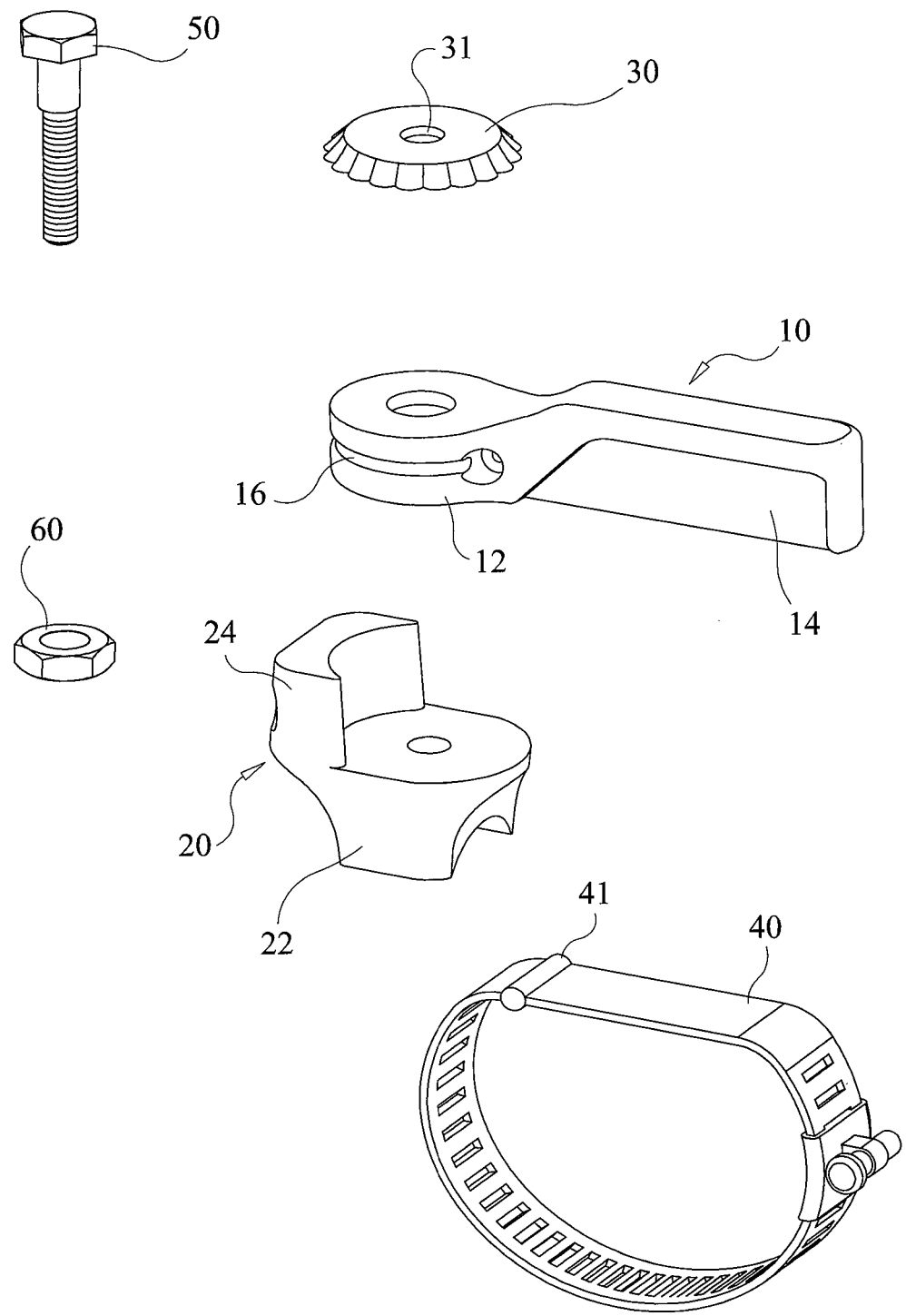
FIG. 7 is a schematic showing the lever member and the base member of FIGS. 1-3 and FIGS. 4-6, respectively, of a first exemplary embodiment of the bicycle shift lever of the present invention along with other common components which can be used for securing the bicycle shift lever of the present invention to a bicycle.

FIG. 7 is a schematic showing the lever member 10 and the base member 20 of FIGS. 1-3 and FIGS. 4-6, respectively, of a first exemplary embodiment of the bicycle shift lever of the present invention along with other common components which can be used for securing the bicycle shift lever of the present invention to a bicycle. The other common components include a flattened bottle cap 30 having a central opening 31 therethrough, a hose clamp 40 having an opening 41 therethrough, a bolt 50, and a nut 60. The bicycle shift lever of the present invention is connected to a new or used bicycle to create a functioning shift lever by seating the circular portion 12 of the lever member 10 on top of the bottom portion 22 of the base member 20 such that it rests against the top side portion 24 of the base member 20, inserting a bicycle cable through a first opening 26 in the top side portion 24 of the base member 20, running the bicycle cable around most of the circumference of the circular portion 12 of the lever member 10 by lying it within channel 16 of circular portion 12, and then out through the second opening 26 in the top side portion 24 of the base member 20, inserting a hose clamp 40 between the circular portion 12 of the lever member 12 and the top of the bottom portion 22 of the base member 20 such that an opening 41 in the hose clamp 40 aligns with opening 15 in circular portion 12 and opening 23 in bottom portion 22, securing the lever member 10 to the hose clamp 40 and the base member 20 by positioning a washer such as a flattened bottle cap 30 having a hole 31 in its center on top of the circular portion 12 of the lever member 10, inserting a bolt 50 through the hole 31 in the flattened bottle cap 30 and the center openings or holes 15, 23 contained within the circular portion 12 of the lever member 10 and the bottom portion 22 of the base member 20, respectively, securing the lever member 10 to the hose clamp 40 and the base member 20 by using a nut 60 positioned adjacent to the bottom of the bottom portion 22 of the base member 20 to tighten the bolt 50, securing the resulting bicycle shift lever to the handlebar of a bicycle with hose clamp 40, and connecting the cable that runs through the bicycle shift lever to the derailleur of the bicycle.

Figure 8:
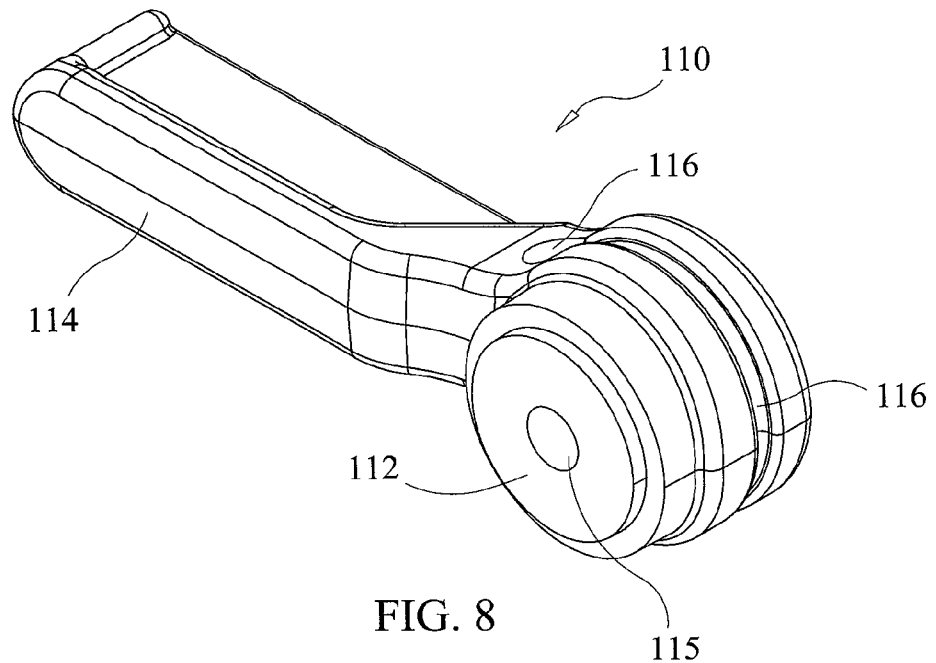
FIG. 8 is perspective view of a lever member of a second exemplary embodiment of a bicycle shift lever of the present invention.
Figure 9:
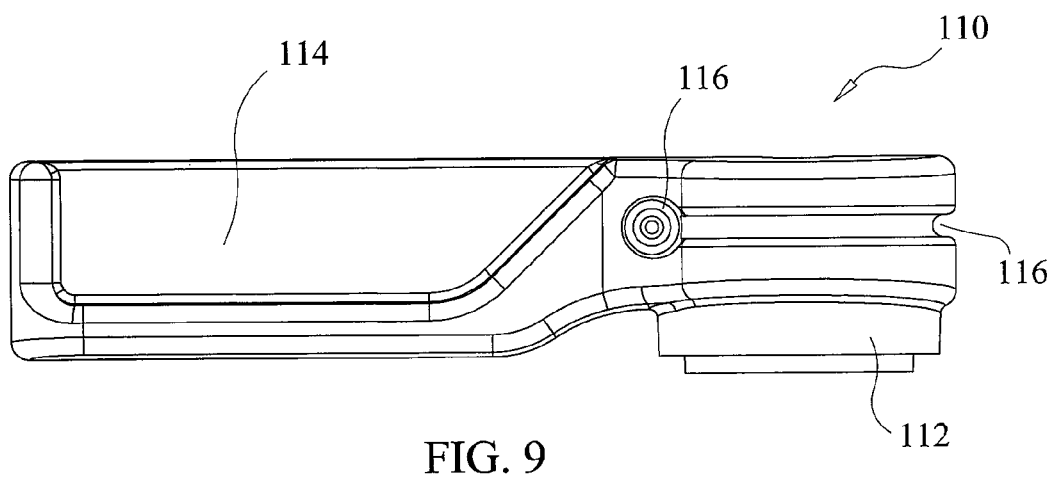
FIG. 9 is a side elevational view of the lever member of the exemplary embodiment of the bicycle shift lever shown in FIG. 8.
Figure 10:
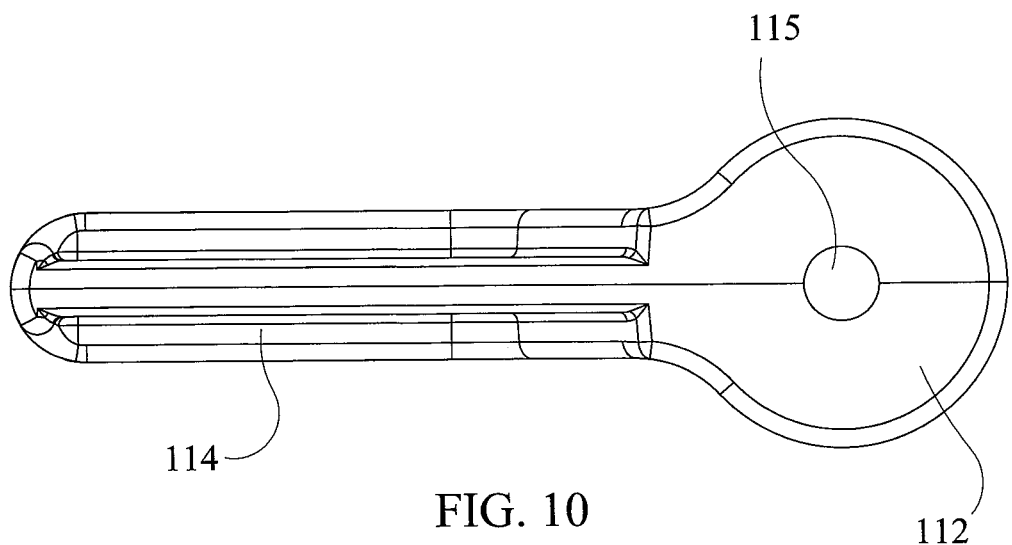
FIG. 10 is a top plan view of the lever member of the exemplary embodiment of the bicycle shift lever shown in FIG. 8.
Figure 11:
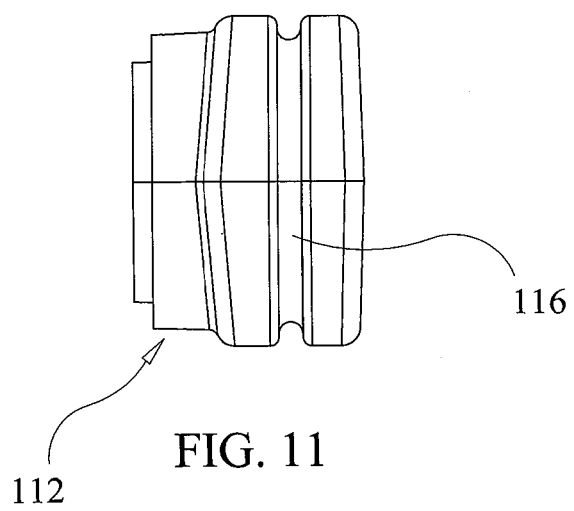
FIG. 11 is a front elevational view of the lever member of the exemplary embodiment of the bicycle shift lever shown in FIG. 8.
Figure 12:
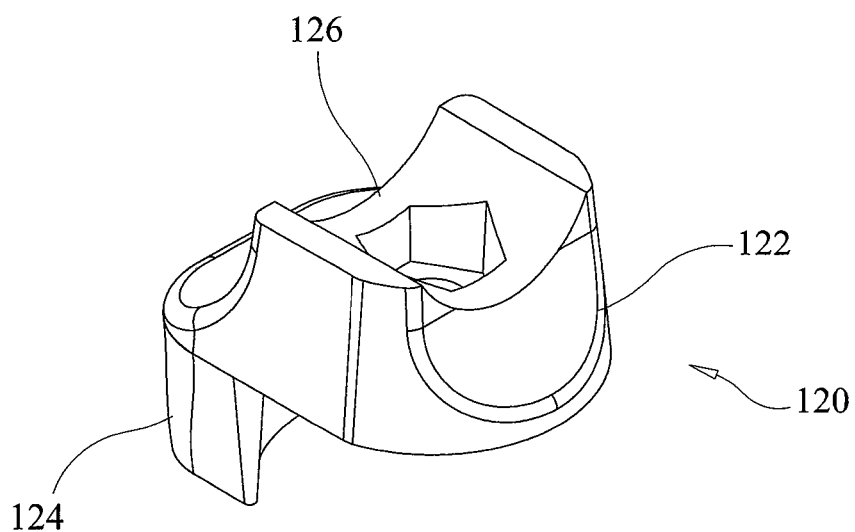
FIG. 12 is a bottom perspective view of a base member of a second exemplary embodiment of a bicycle shift lever of the present invention.
Figure 13:
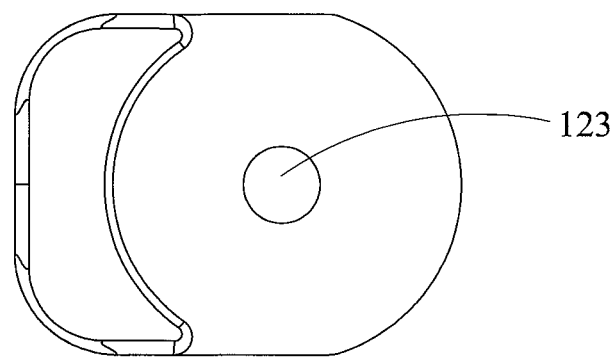
FIG. 13 is a bottom plan view of the base member of the exemplary embodiment of the bicycle shift lever shown in FIG. 12.
Figure 14:
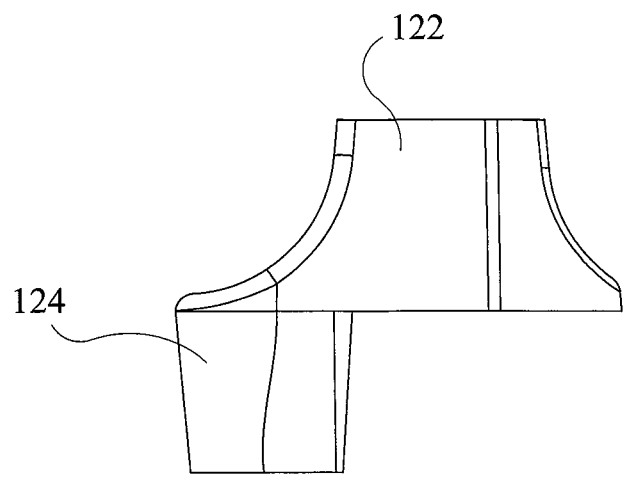
FIG. 14 is a side elevational view of the base member of the exemplary embodiment of the bicycle shift lever shown in FIG. 12.
Figure 15:
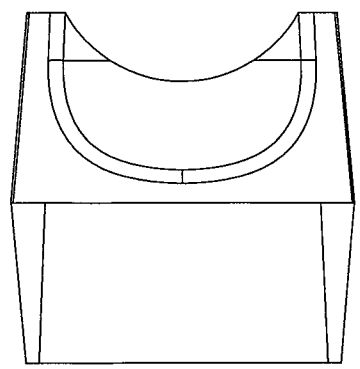
FIG. 15 is front elevational view of the base member of the exemplary embodiment of the bicycle shift lever shown in FIG. 12.

FIG. 8 is perspective view of a lever member 110 of a second exemplary embodiment of a bicycle shift lever of the present invention where lever member 110 includes a circular portion 112 that extends into a bar member portion 114. Circular portion 112 of lever member 110 has a central opening 115 contained therethrough and a channel 116 positioned about its circumference where the channel 116 functions to retain a cable that is connected to a derailler on a bicycle. FIG. 9 is a side elevational view of the lever member 110 shown in FIG. 8, FIG. 10 is a top plan view of the lever member of the exemplary embodiment of the bicycle shift lever shown in FIG. 8, and FIG. 11 is a front elevational view of the lever member of the exemplary embodiment of the bicycle shift lever shown in FIG. 8.

A base member 120 of a second exemplary embodiment of a bicycle shift lever of the present invention is shown in FIGS. 12-15. Base member 120 includes a bottom portion 122 having a central opening 123 contained therethrough and a top side portion 124, having two openings 126 contained therein, extending from the bottom portion 122. Bottom portion 122 has one or more curved edges 126 to facilitate seating the base member 120 of the second exemplary embodiment of the bicycle shift lever of the present invention onto a handlebar of a bicycle. The same cable that is retained by channel 116 in circular portion 112 of lever member 110 is inserted through openings 126 and then connected to the derailler on a bicycle when the components of the bicycle shift lever of the present invention are coupled together.

Figure 16:
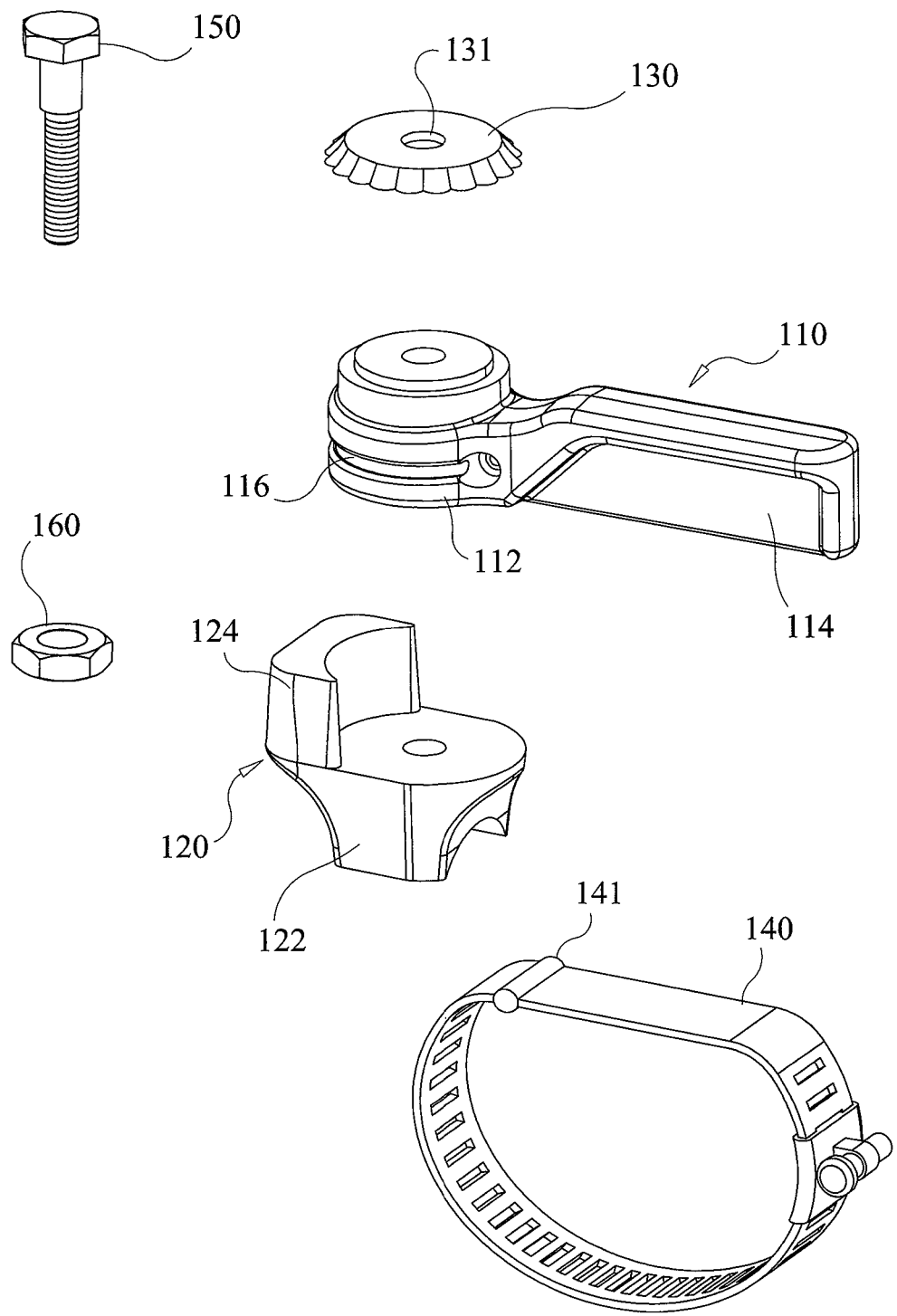
FIG. 16 shows perspective views of the lever member and the base member of FIGS. 8-11 and FIGS. 12-15, respectively, of a second exemplary embodiment of the bicycle shift lever of the present invention along with other common components which can be used for securing the bicycle shift lever of the present invention to a bicycle.

FIG. 16 shows perspective views of the lever member 110 and the base member 120 of FIGS. 8-11 and FIGS. 12-15, respectively, of a second exemplary embodiment of the bicycle shift lever of the present invention along with other common components which can be used for securing the bicycle shift lever of the present invention to a bicycle. The other common components include a flattened bottle cap 130 having a central opening 131 therethrough, a hose clamp 140 having an opening 141 therethrough, a bolt 150, and a nut 160. The bicycle shift lever of the present invention is connected to a new or used bicycle to create a functioning shift lever in the same way that was previously described in reference to FIG. 7.

Figure 17:
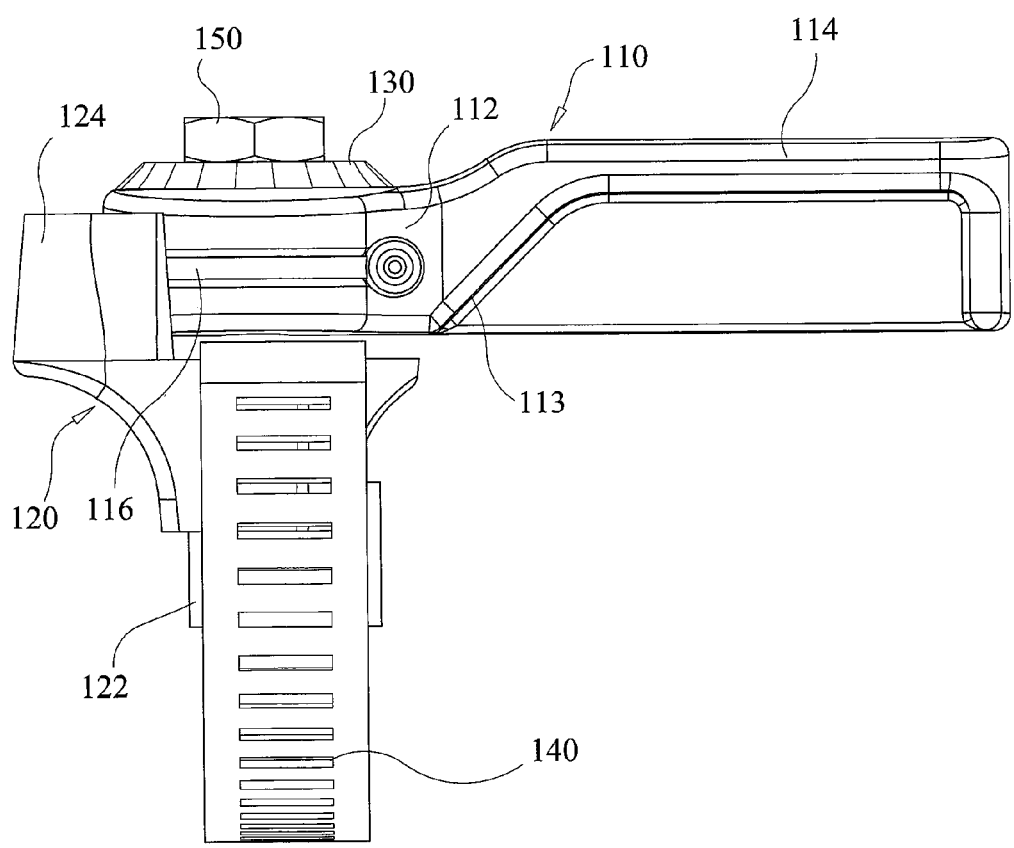
FIG. 17 is a perspective view of the components in FIG. 16 of a second exemplary embodiment of the bicycle shift lever of the present invention shown coupled together to form a completed bicycle shift lever shown without coupling to the cables that are attached to a derailler.
Figure 18:
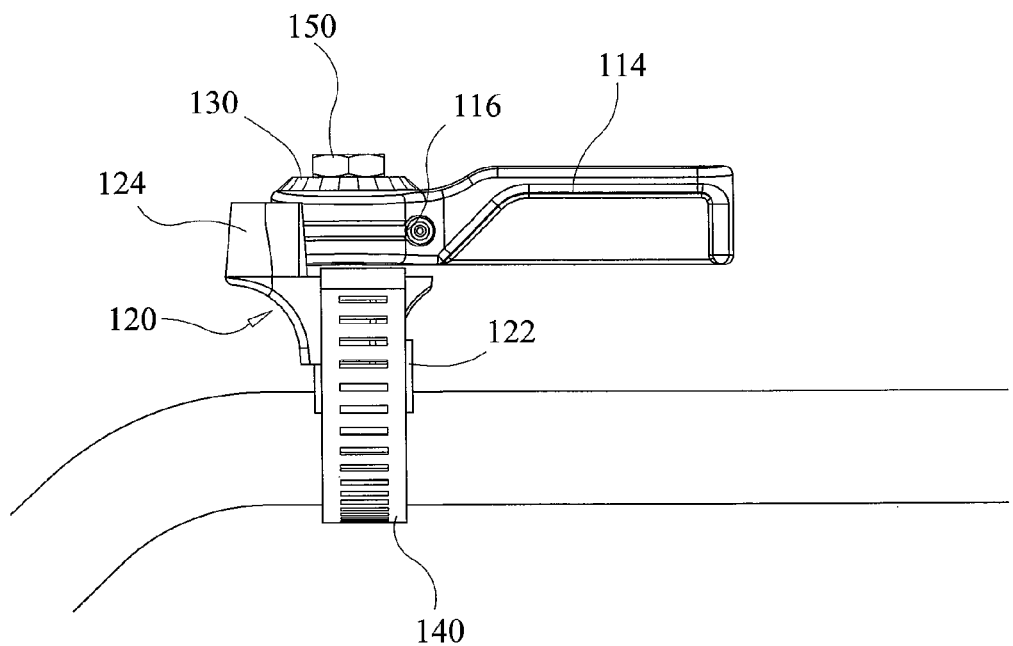
FIG. 18 is a perspective view of the second exemplary embodiment of the bike shift lever shown in FIG. 18 shown connected to a handlebar of a bicycle.

FIG. 17 is a perspective view of the components in FIG. 16 of a second exemplary embodiment of the bicycle shift lever of the present invention shown coupled together to form a completed bicycle shift lever shown without coupling to the cables that are attached to a derailler. Bar member portion 114 of lever member 110 may include one or more ridges or ridge members 113 to facilitate engagement of the bicycle shift lever by a user's finger or thumb. FIG. 18 is a perspective view of the second exemplary embodiment of the bike shift lever shown in FIG. 18 shown connected to a handlebar of a bicycle.

The bicycle shift lever of the present invention offers several advantages over the common sport-only shift levers including 1) that the lever member and base member are symmetrical and that the base member has two openings (holes) so that the shift lever can be used on either the right side or left side of the handlebars, 2) that the entire bicycle shift lever uses only six parts when completely put together, 3) that the bicycle shift lever is easily repaired with common parts, 4) that the lever member and base member may be primitively cast using scrap aluminum, 5) that the bicycle shift lever is designed for people who depend on their bicycle as well as those people with weak or injured hands, and 6) that the bicycle shift lever supports an upside-down bicycle during repair.

The detailed description of exemplary embodiments of the invention herein shows various exemplary embodiments. These exemplary embodiments are described in sufficient detail to enable those skilled in the art to practice the invention and are not intended to limit the scope, applicability, or configuration of the invention in any way. Rather, the following disclosure is intended to teach both the implementation of the exemplary embodiments and any equivalent embodiments that are known or obvious to those reasonably skilled in the art. Additionally, all included figures are non-limiting illustrations of the exemplary embodiments, which similarly avail themselves to any equivalent embodiments that are known or obvious to those reasonably skilled in the art.

Other combinations and/or modifications of structures, arrangements, applications, proportions, elements, materials, or components used in the practice of the instant invention, in addition to those not specifically recited, can be varied or otherwise particularly adapted to specific environments, manufacturing specifications, design parameters, or other operating requirements without departing from the scope of the instant invention and are intended to be included in this disclosure.

Unless specifically noted, it is the Applicant's intent that the words and phrases in the specification and the claims be given the commonly accepted generic meaning or an ordinary and accustomed meaning used by those of ordinary skill in the applicable arts. In the instance where these meanings differ, the words and phrases in the specification and the claims should be given the broadest possible, generic meaning. If any other special meaning is intended for any word or phrase, the specification will clearly state and define the special meaning.

The invention claimed is:

1. A bicycle shift lever comprising:
   a lever member having a circular portion that extends into a bar member portion wherein the circular portion includes a top planar surface and a bottom planar surface and a channel around its circumference and an opening through its center; and
   a base member having a bottom portion with a top exterior planar surface and a top side portion, having two openings therein, extending from the bottom portion without covering the top exterior planar surface such that the bottom planar surface of the circular portion of the lever member can be seated on the top exterior planar surface of the bottom portion, and adjacent to the top side portion, of the base member.

2. The bicycle shift lever of claim 1 wherein at least a portion of the channel in the circular portion of the lever member is in alignment with the two openings in the top side portion of the base member when the circular portion of the lever member is seated on top of the bottom portion, and adjacent to the top side portion, of the base member.

3. The bicycle shift lever of claim 1 wherein the bottom portion of the base member comprises at least one curved bottom edge for engaging a handlebar of a bicycle.

4. The bicycle shift lever of claim 1 wherein the bar member portion of the lever member comprises one or more ridges.

5. The bicycle shift lever of claim 1 further comprising a flattened bottle cap with an opening therethrough, a nut, a bolt, and a hose clamp.

6. The bicycle shift lever of claim 1 further comprising a washer, a nut, a bolt, and a hose clamp.

* * * * *